US009443433B1

(12) United States Patent
Conway et al.

(10) Patent No.: US 9,443,433 B1
(45) Date of Patent: Sep. 13, 2016

(54) METHOD AND SYSTEM TO MONITOR FOR CONFORMANCE TO A TRAFFIC CONTROL INSTRUCTION

(71) Applicant: THE BOEING COMPANY, Chicago, IL (US)

(72) Inventors: Sheila Ruth Conway, Seattle, WA (US); Charles Otis Adler, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/694,510

(22) Filed: Apr. 23, 2015

(51) Int. Cl.
*G01C 21/00* (2006.01)
*G01C 23/00* (2006.01)
*G08G 5/00* (2006.01)
*G10L 15/26* (2006.01)

(52) U.S. Cl.
CPC .......... *G08G 5/0013* (2013.01); *G08G 5/0047* (2013.01); *G10L 15/26* (2013.01)

(58) Field of Classification Search
CPC ... G08G 5/0013; G08G 5/0047; G10L 15/26
See application file for complete search history.

(56) References Cited

U.S. PATENT DOCUMENTS

| 6,812,890 | B2 | 11/2004 | Smith et al. |
| 7,881,832 | B2 | 2/2011 | Komer et al. |
| 8,301,446 | B2 | 10/2012 | Shu |
| 8,731,810 | B2 | 5/2014 | Conway |
| 2014/0142849 | A1* | 5/2014 | Ziezold ............ G01C 21/3641 701/533 |
| 2014/0173018 | A1* | 6/2014 | Westphal ............ H04L 41/0823 709/213 |
| 2015/0100311 | A1* | 4/2015 | Kar ................... G08G 5/0013 704/231 |

OTHER PUBLICATIONS

Cordero, José Manuel et al., Automated Speech Recognition in ATC Environment, Proceedings of the 2nd International Conference on Application and Theory of Automation in Command and Control Systems, May 29, 2012, pp. 46-53, IRIT Press Toulouse, France.
Trikas, Thanassis, Automated Speech Recognition in Air Traffic Control, Department of Aeronautics & Astronautics, FTL Report R87-2, Jan. 1987, pp. 1-45, MIT, Cambridge, United States.
Trikas, Thanassis, Automated Speech Recognition in Air Traffic Control, Department of Aeronautics & Astronautics, FTL Report R87-2, Jan. 1987, pp. 46-96, MIT, Cambridge, United States.
Trikas, Thanassis, Automated Speech Recognition in Air Traffic Control, Department of Aeronautics & Astronautics, FTL Report R87-2, Jan. 1987, pp. 96-116, MIT, Cambridge, United States.

(Continued)

*Primary Examiner* — Erin File
(74) *Attorney, Agent, or Firm* — Patterson + Sheridan, LLP

(57) ABSTRACT

Method, system, and computer program product for monitoring vehicle compliance with a vehicle operating instruction provided by a traffic controller. A spoken vehicle operating instruction is translated into a computer-readable instruction that can be used for data entry and/or retrieval. The computer-readable instruction is transformed into an expected vehicle operating trajectory by mapping to a published vehicle procedure or by calculating a trajectory based on provided instructions. The vehicle is monitored as it operates. In the event the monitored operation differs or is forecast to differ from conformance limits associated with the expected trajectory, an alert can be provided.

20 Claims, 14 Drawing Sheets

(56) References Cited

OTHER PUBLICATIONS

Schäefer, Dirk, Eurocontrol Experimental Control: Context-Sensitive Speech Recognition in the Air Traffic Control Simulation, European Organisation for the Safety of Air Navigation, Feb. 2001, pp. 1-100, Eurocontrol Experimental Centre, Paris, France.

Schäefer, Dirk, Eurocontrol Experimental Control: Context-Sensitive Speech Recognition in the Air Traffic Control Simulation, European Organisation for the Safety of Air Navigation, Feb. 2001, pp. 101-193, Eurocontrol Experimental Centre, Paris, France.

\* cited by examiner

FIG. 4A

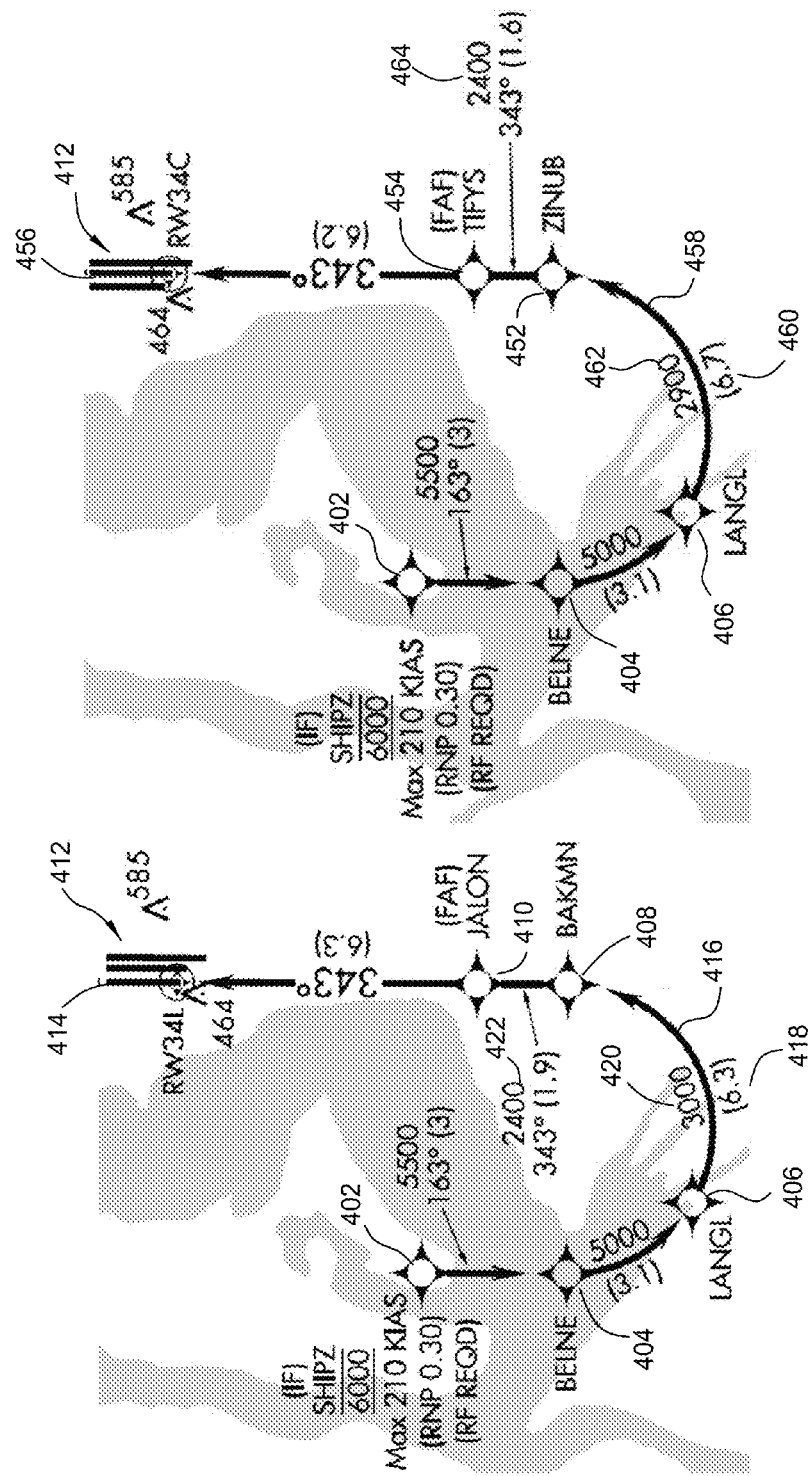

US 9,443,433 B1

METHOD AND SYSTEM TO MONITOR FOR CONFORMANCE TO A TRAFFIC CONTROL INSTRUCTION

BACKGROUND

Aspects described herein to traffic control, and more specifically, to providing automated conformance monitoring for conformance to orally-provided traffic instructions.

SUMMARY

According to one aspect, a computer-implemented method includes receiving a first audio communication that includes at least one spoken vehicle operating instruction to an operator of a vehicle. The method also includes performing speech-to-text translation on the first audio communication, using a computer processor, to convert at least one spoken vehicle operating instruction from the first audio communication into at least one computer-readable vehicle operating instruction. The method also includes transforming the at least one computer-readable vehicle operating instruction into a first expected vehicle operating trajectory for the vehicle, using the computer processor. The method also includes monitoring operation of the vehicle. The method also includes providing a first alert upon the monitored operation of the vehicle differing from the expected vehicle operating trajectory by a first threshold amount.

According to one aspect, a system includes a receiver configured to receive spoken audio communications between a vehicle traffic controller and an operator of a vehicle. The system also includes a tracking module configured to receive information related to operation of the vehicle. The system also includes a display module. The system also includes a computer processor configured to perform speech-to-text translation on a spoken vehicle operating instruction from the vehicle traffic controller, received in a first audio communication by the receiver, to convert the at least one spoken vehicle operating instruction into at least one computer-readable vehicle operating instruction. The computer processor is also configured to transform the at least one computer-readable vehicle operating instruction into an expected vehicle operating trajectory for the vehicle. The computer processor is also configured to monitor operation of the vehicle, based on information related to operation of the vehicle received by the tracking module. The computer processor is also configured to output to the display module a first alert upon the monitored operation of the vehicle differing from the expected vehicle operating trajectory by a first threshold amount.

According to one aspect, a computer program product for monitoring vehicle compliance with a spoken operating instruction includes a computer-readable storage medium having computer-readable program code embodied therewith. The computer-readable program code is executable by one or more computer processors to receive a first audio communication that includes at least one spoken vehicle operating instruction to an operator of a vehicle. The computer-readable program code is also executable to perform speech-to-text translation on the first audio communication to convert the at least one spoken vehicle operating instruction from the first audio communication into at least one computer-readable vehicle operating instruction. The computer-readable program code is also executable to transform the at least one computer-readable vehicle operating instruction into a first expected vehicle operating trajectory for the vehicle using the computer processor. The computer-readable program code is also executable to monitor operation of the vehicle. The computer-readable program code is also executable to output a first alert upon the monitored operation of the vehicle differing from the expected vehicle operating trajectory by a first threshold amount.

BRIEF DESCRIPTION OF THE SEVERAL VIEWS OF THE DRAWINGS

FIG. 4A is an exemplary Required Navigation Performance (RNP) approach chart for runway 34L at SEA;

FIG. 4B is a first detail view of the exemplary RNP approach chart shown in FIG. 4A;

FIG. 4D is a detail view of the exemplary RNP approach chart shown in FIG. 4C;

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In various circumstances, movement of vehicles is coordinated, controlled, and monitored by vehicle traffic controllers. For example, air traffic controllers monitor and direct the movement of aircraft in controlled airspace. Air traffic controllers provide direction to aircraft using a "hear back/read back" protocol in which the traffic controller speaks an instruction to the pilot(s) of an aircraft over a radio and the pilot(s) read back the instruction or portions of the instruction so the traffic controller knows that the message was correctly received. The traffic controller must then monitor the aircraft via surveillance (e.g., radar, multilateration, Automated Dependent Surveillance-Broadcasting (ADS-B) systems) to ensure the aircraft does what was instructed. Often, air traffic controllers are monitoring many aircraft at once. It is therefore possible that an aircraft not following instructions could go unnoticed by an air traffic controller.

Figure 1:
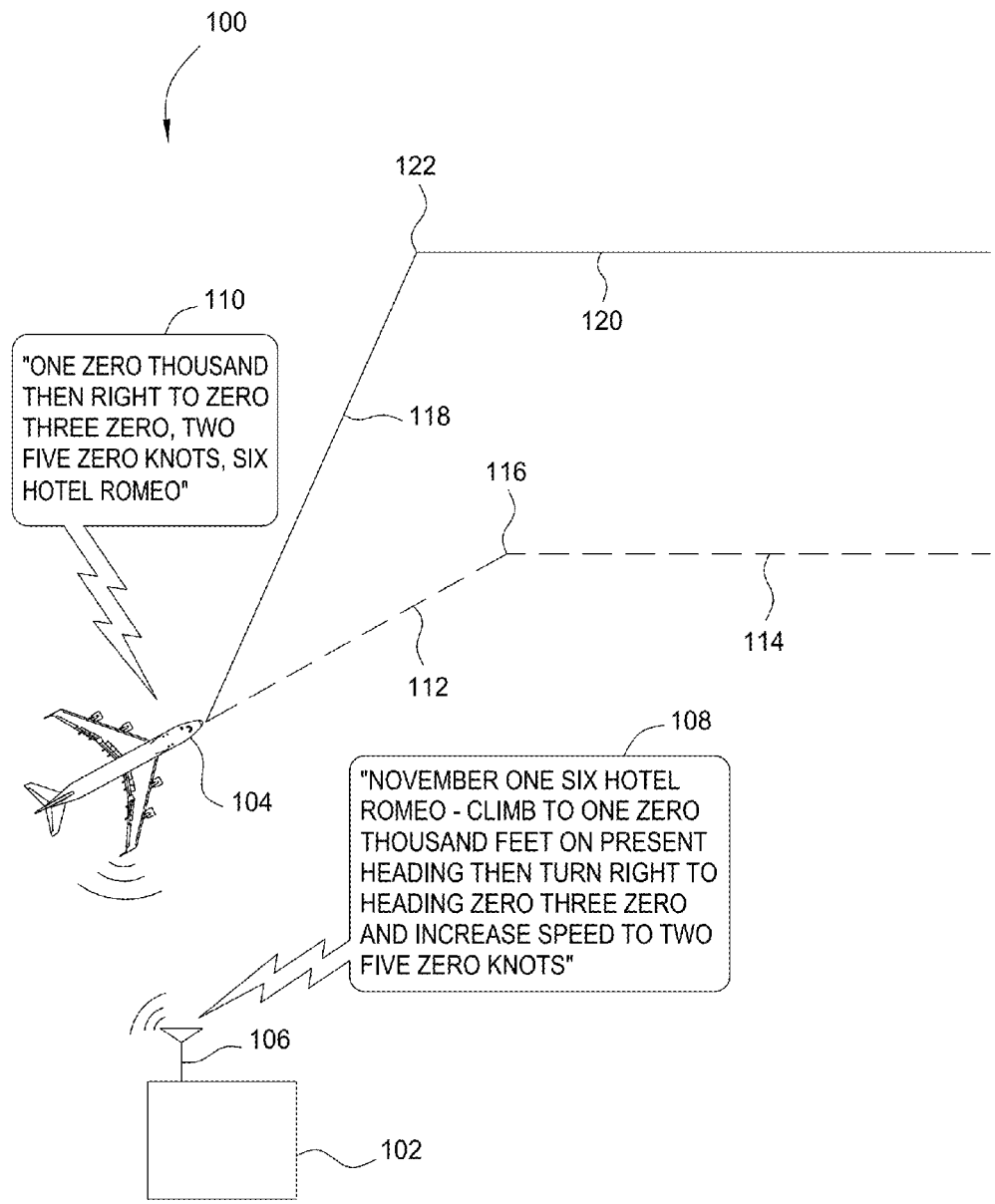
FIG. 1 is a perspective schematic view of an aircraft following a trajectory as instructed by an air traffic controller.

FIG. 1 illustrates an exemplary scenario 100 in which an air traffic controller, located in a control room 102, broadcasts a spoken vehicle operating instruction 108 via a radio antenna 106 to a pilot or pilots of an aircraft 104. In the exemplary scenario 100 illustrated in FIG. 1, the aircraft 104 is currently at an altitude of 2,000 feet, traveling at an airspeed of 200 knots, and traveling on a heading of 0° (i.e., due north). The spoken vehicle operating instruction 108 in this exemplary scenario is "November one six hotel romeo—climb to one zero thousand feet on present heading then turn right to heading zero three zero and increase speed to two five zero knots." The instruction leads with the call sign of the aircraft 104—N16HR—so that all aircraft listening know which aircraft the instruction 108 is intended for. The instruction 108 defines a trajectory for the aircraft 104 that includes two portions. For a first portion of the instructed trajectory, the aircraft 104 follows its current heading and speed while climbing to an altitude of 10,000 feet (from its current altitude). For a second portion of the instructed trajectory, the aircraft makes a right turn to a heading of 030° (north northeast) and increases airspeed to 250 knots after the aircraft reaches 10,000 feet. FIG. 1 illustrates the expected vehicle trajectory for the aircraft 104 based on the spoken vehicle operating instruction 108 in two ways. FIG. 1 includes two dashed lines 112 and 114, which represent the expected vehicle trajectory over the ground (i.e., an expected ground track for the aircraft 104) and two solid lines 118 and 120, which represent the expected vehicle trajectory including altitude. Dashed line 112 and solid line 118 represent the first portion of the expected vehicle operating trajectory in which the aircraft climbs from its present altitude to 10,000 feet while maintaining its current heading and airspeed. The intersection 116 between the dashed lines 112 and 114 and the intersection 122 between the solid lines 118 and 120 represent the point where the aircraft is expected to reach 10,000 feet and turn to heading of 030° while increasing speed to 250 knots. Dashed line 114 and solid line 120 represent the second portion of the expected vehicle operating trajectory in which the aircraft 104 has turned to a heading of 030° and has increased airspeed to 250 knots.

After the air traffic controller speaks the instruction 108, the pilots of the aircraft 104 respond with a spoken confirmation (i.e., a confirmation readback 110) by repeating at least certain important details of the message to confirm to the air traffic controller that the message was properly understood. In the exemplary scenario, the confirmation readback 110 is "one zero thousand feet then right turn to zero three zero, two five zero knots, six hotel romeo." In the exemplary confirmation readback 110, the pilot has omitted certain words or phrases to shorten the transmission. For example, the pilot omitted all but the last three characters of the call sign, which is common practice in the United States after a pilot has initiated contact with air traffic control. As another example, the pilot also did not repeat the detail of the instruction to stay on the current heading during the climb. Furthermore, the pilot also said "right to zero three zero" instead of saying "turn right to heading zero three zero."

After the above-described spoken vehicle operating instruction 108 and confirmation readback 110 between the air traffic controller and the pilots in the exemplary scenario 100, the air traffic controller will monitor the progress of the aircraft 104 (while also monitoring the progress of other aircraft for which the air traffic controller is responsible). There are different ways that an air traffic controller can monitor the progress of aircraft. For example, various surveillance facilities track the positions of aircraft every few seconds (e.g., every four seconds). In many instances, transponders onboard the aircraft broadcast a transponder code, assigned by the air traffic controller, when the aircraft is "pinged" by the surveillance. The transponder can also report the barometric altitude of the aircraft in the broadcast. The aircraft positions returned by surveillance and the altitude-encoding transponders can be displayed on a computer display screen used by the air traffic controller. As another example, many aircraft are now equipped with enhanced surveillance (ES) transponders and/or automatic dependent surveillance-broadcast (ADS-B) transceivers. The ADS-B transceivers onboard the aircraft periodically report their positions (determined via high-precision navigation). In various instances, the ES and/or ADS-B transceivers can also report elements of aircraft intent, meaning reporting aspects of aircraft operation that will affect the position of the aircraft. Examples of aircraft intent could include aircraft roll rate, roll angle, true track angle, true track rate, selected attitude, target attitude, climb angle, engine thrust setting, and the like. Other examples of aircraft intent could include intended flight path information, downstream routing instructions, the next controlling altitude constraint, or other strategic vehicle trajectory information.

Figure 2:
FIG. 2 is an exemplary Standard Instrument Departure (SID) chart for Seattle-Tacoma International Airport (SEA)

In various aspects, an instruction by an air traffic controller may reference a published procedure, which may be retrieved from a data structure. For example, pre-planned procedures exist for approaching an airport, lining up to land on a particular runway at an airport, and for departing from an airport after takeoff. FIG. 2 illustrates a Standard Instrument Departure (SID) chart 200 for Seattle-Tacoma International Airport (SEA). The SID chart 200 includes procedures for an aircraft to follow after taking off from runway 16L 202, runway 16C 208, or runway 16R 204 at the airport 202. The instructions on the SID chart 200 guide an aircraft from the airport 202 to the NICHY intersection 210. The instructions on the SID chart 200 then guide the aircraft from the NICHY intersection 210 to the ELMAA intersection 212. The instructions on the SID chart 200 then guide the aircraft to either the CORVALIS radio beacon 214 (i.e., a VHF omnidirectional radio (VOR)) or to the HOQUIAM radio beacon 216. The SID chart 200 provides headings and altitudes for the different legs between intersections and/or radio beacons. The headings and altitudes and the radio beacons and intersections define a trajectory for the aircraft to follow.

Figure 3A:
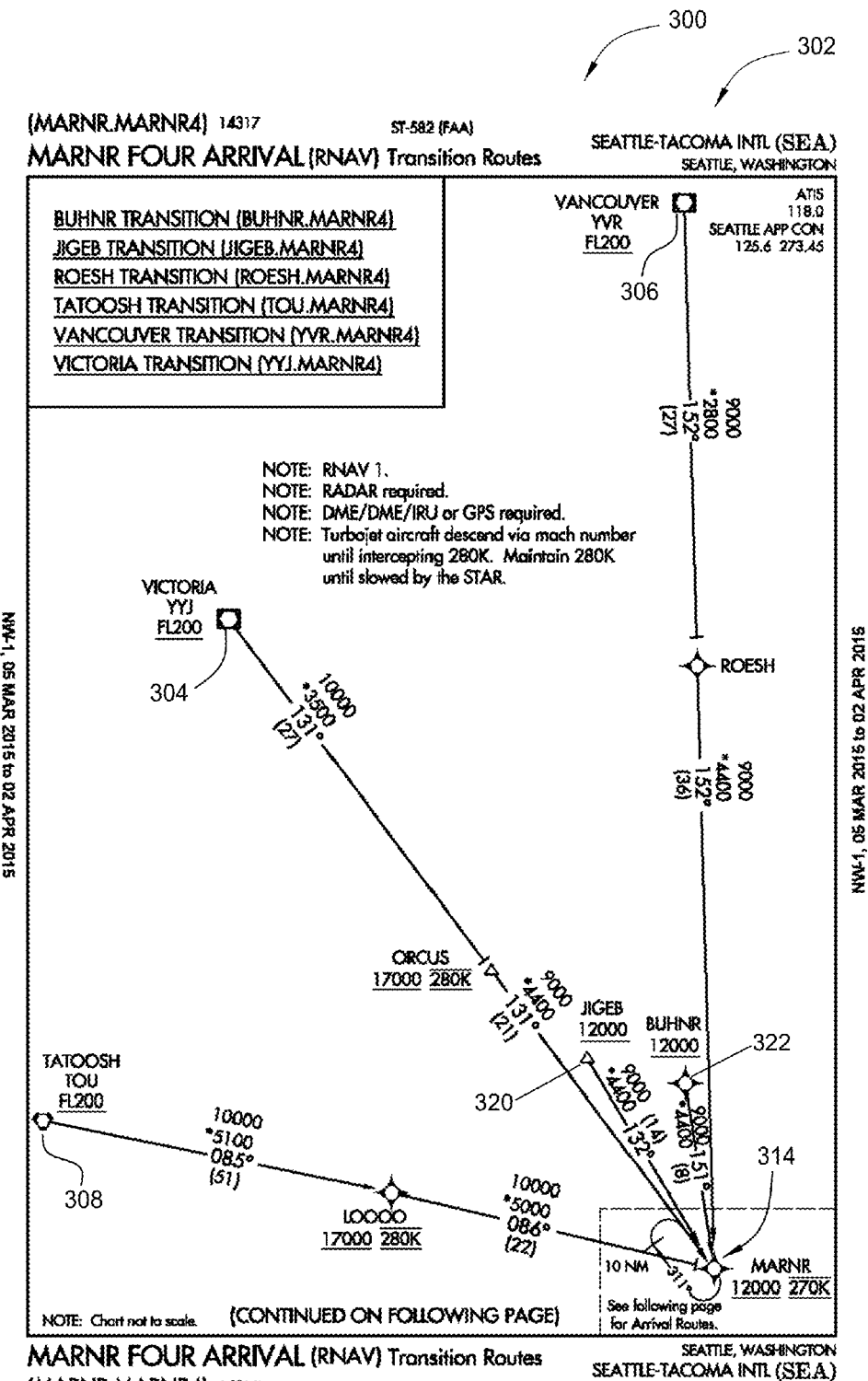
FIGS. 3A and 3B are an exemplary Standard Terminal Arrival Route (STAR) chart for SEA.
Figure 3B:
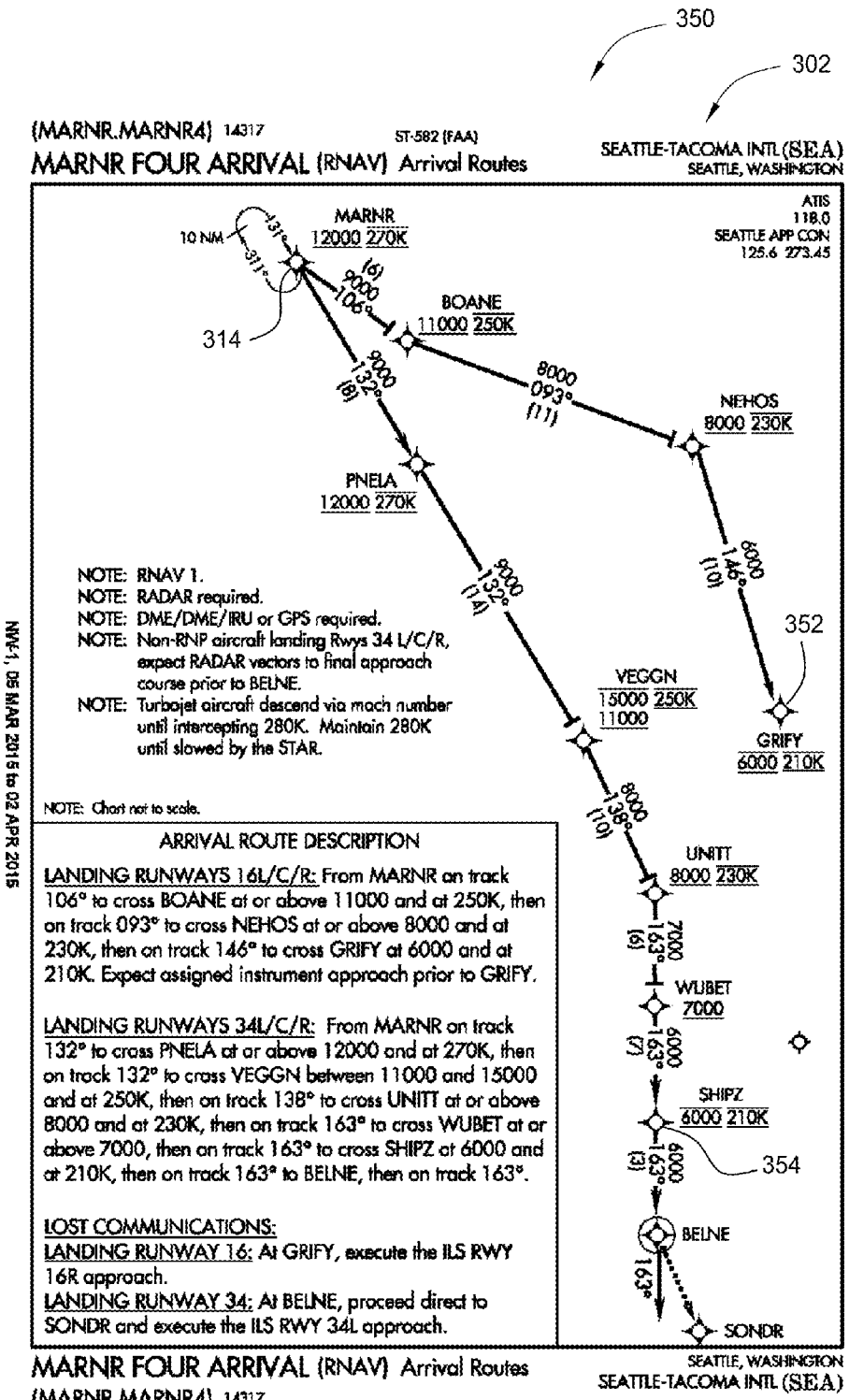

FIGS. 3A and 3B illustrate pages 1 and 2, respectively, of an area navigation (RNAV) Standard Terminal Arrival Route (STAR) chart 300, 350 for SEA 302. The STAR chart 300 includes procedures for an aircraft to follow to approach SEA 302. The STAR chart 300 includes procedures for an aircraft to approach SEA 302 from the VICTORIA radio beacon 304, the VANCOUVER radio beacon 306, the JIGEB intersection 320, the BUHNR intersection 322, or the TATOOSH radio beacon 308. The STAR chart 300 guides the aircraft to the MARNR waypoint 314. The aircraft would receive instructions prior to reaching the MARNR waypoint 314 to line up for landing on a north or south flow runway via the SHIPZ waypoint 354 or the GRIFY waypoint 352. The STAR charts 300, 350 provide headings and altitudes for the different legs between waypoints and/or navigation aids. The headings and altitudes, navigation aids, waypoints, and intersections define a trajectory for the aircraft to follow. For example, at the MARNR waypoint 314, the airplane speed is required to be 270 knots and the altitude must be at or above 12,000 feet. These published procedures are retrievable from a computer data structure, and also can include required navigation performance and adherence requirements. Non-conformance to these constraints inherent to these procedures can be used to alert an air traffic controller or a flight crew to a discrepancy between the cleared route and the actual flight track, either sensed or predicted.

Figure 4A:
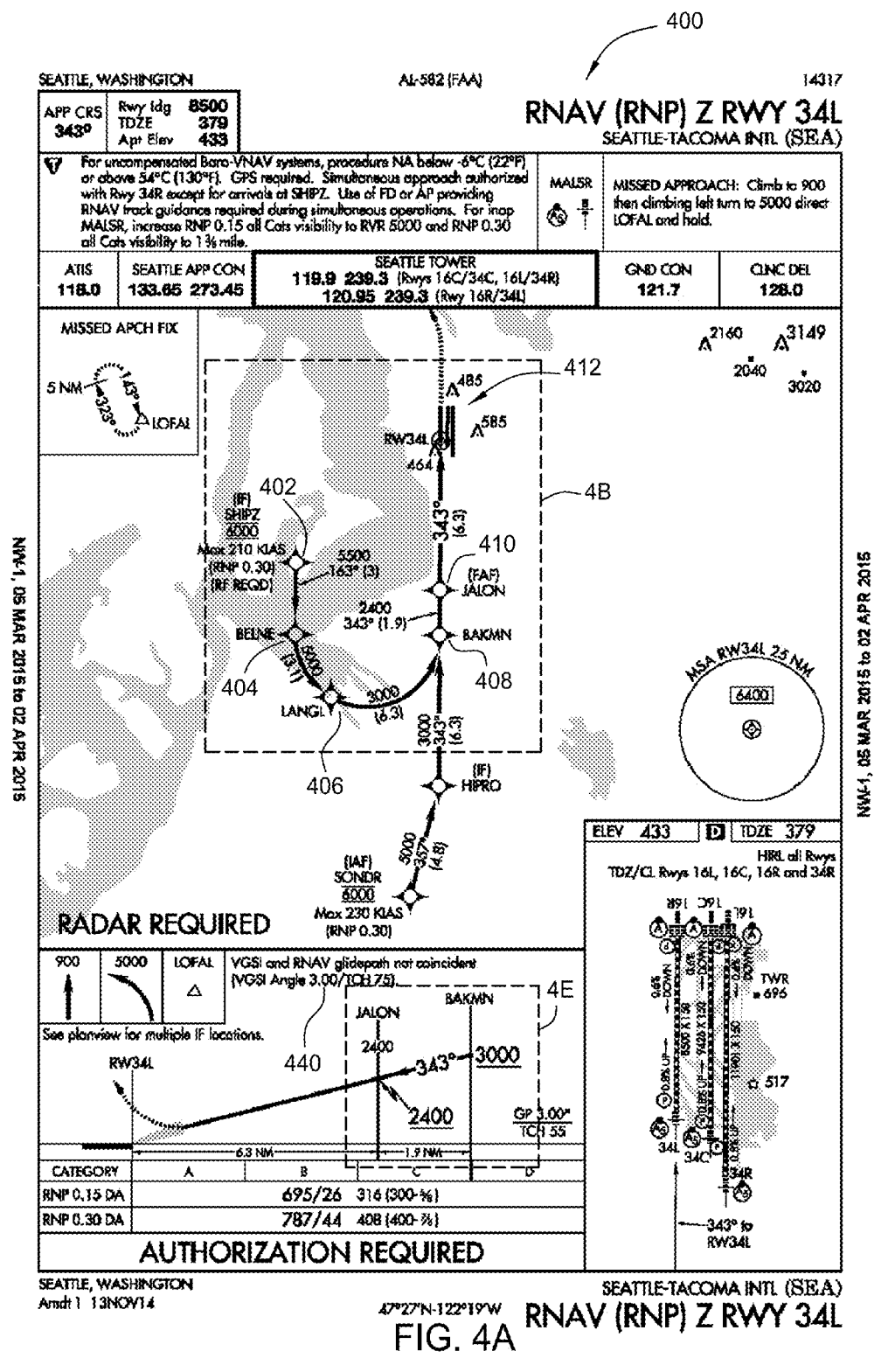
Figure 4C:
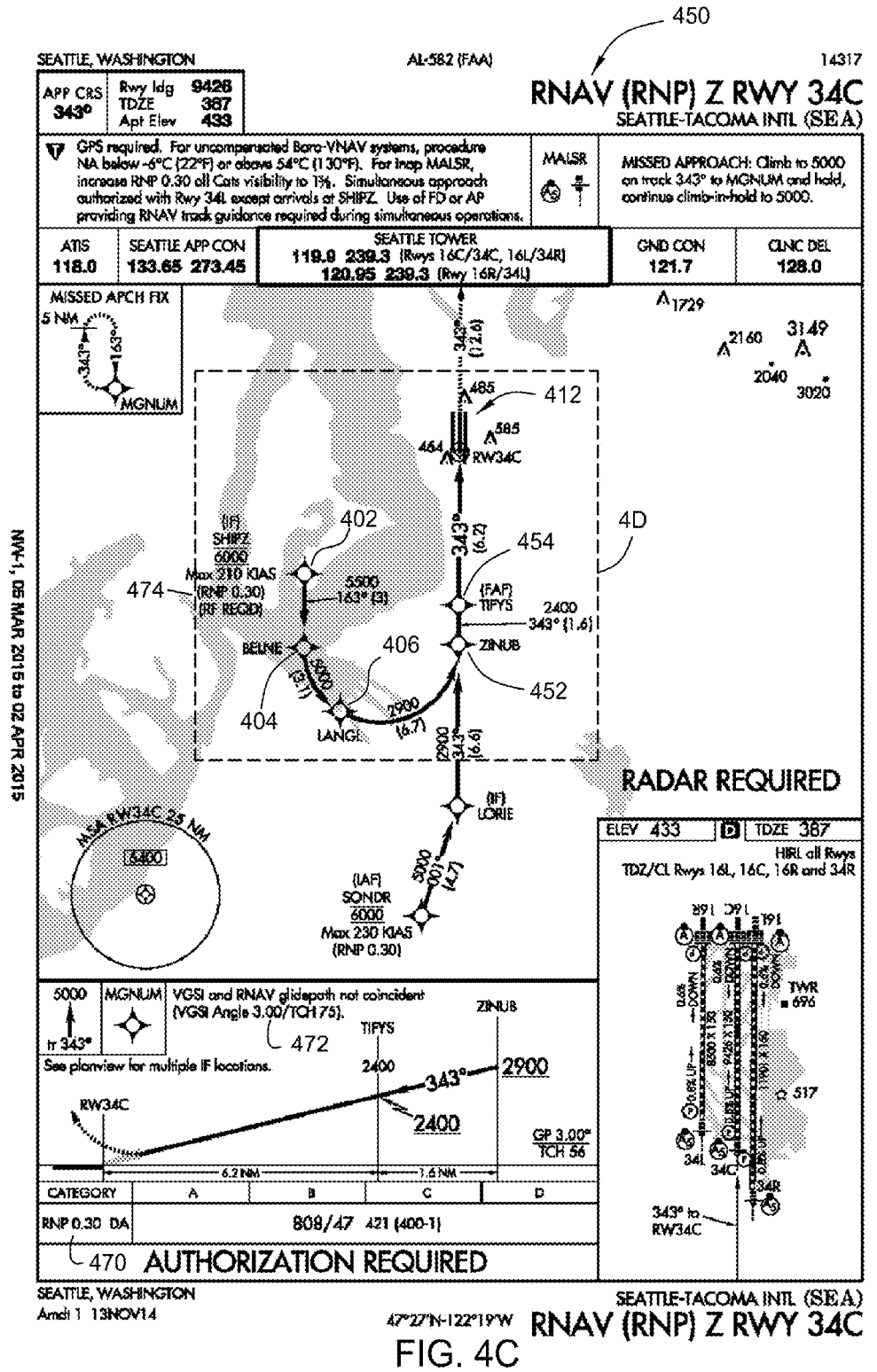
FIG. 4C is an exemplary RNP approach chart for runway 34C at SEA.

FIGS. 4A-4E illustrate exemplary required navigation performance (RNP) approach charts for SEA. FIG. 4A illustrates an exemplary RNP approach chart 400 for an approach to runway 34L, which includes a curved transition (see reference number 414 in FIG. 4B) at SEA 412. FIG. 4C illustrates an exemplary RNP approach chart 450 for an approach to runway 34C, which includes a curved transition (see reference number 456 in FIG. 4D) at SEA 412. The procedures for both approaches start at the SHIPZ waypoint 402 at an altitude of 6,000 feet and then guide the aircraft to the BELNE waypoint 404 while descending. Both procedures then guide the aircraft to the LANGL waypoint 406 while continuing the descent. At the LANGL waypoint 406, the two procedures diverge. The RNP approach chart 400 for runway 34L guides the aircraft on a relatively tight left-hand turn to the BAKMN waypoint 408 while descending no lower than an altitude of 3,000 feet (see reference number 420 in FIG. 4B) at the BAKMN waypoint 408. Under the guidance provided by the RNP approach chart 400, the track distance in the turn from the LANGL waypoint 406 to the BAKMN waypoint 408 is 6.3 nautical miles (see reference number 418) in FIG. 4B). The information retrieved for this procedure from a data structure could include the specific radius and center point of this turn, defining a single curved ground-referenced track to fly. Additionally, the type of procedure and the information contained within the verbal instruction defines the variation allowed while aircraft is performing the procedure (in this case in the designation of a defined Required Navigation Performance value, RNP), and defines the conformance limits for executing the procedure. From the BAKMN waypoint 408, the RNP approach chart 400 guides the aircraft to the JALON waypoint 410 at an altitude of no lower than 2,400 feet (see reference number 422 in FIG. 4B), which is the Final Approach Fix (FAF) for descent to runway 34L 414 on a ground-referenced three degree vertical path 440. By contrast, the RNP approach chart 450 for runway 34C guides the aircraft on a relatively larger left-hand turn from the LANGL waypoint 406 to the ZINUB waypoint 452 while descending to an altitude of no lower than 2,900 feet (see reference number 462 in FIG. 4D) at the ZINUB waypoint 452. Under the guidance provided by the RNP approach chart 450, the track distance for the turn from the LANGL waypoint 406 to the ZINUB waypoint 452 is 6.7 nautical miles (see reference number 460 in FIG. 4D). From the ZINUB waypoint 452, the RNP approach chart 450 guides the aircraft to the TIFYS waypoint 454, which is the designated FAF for descent to runway 34C 456 on a ground-referenced three degree vertical path 472.

Figure 5:
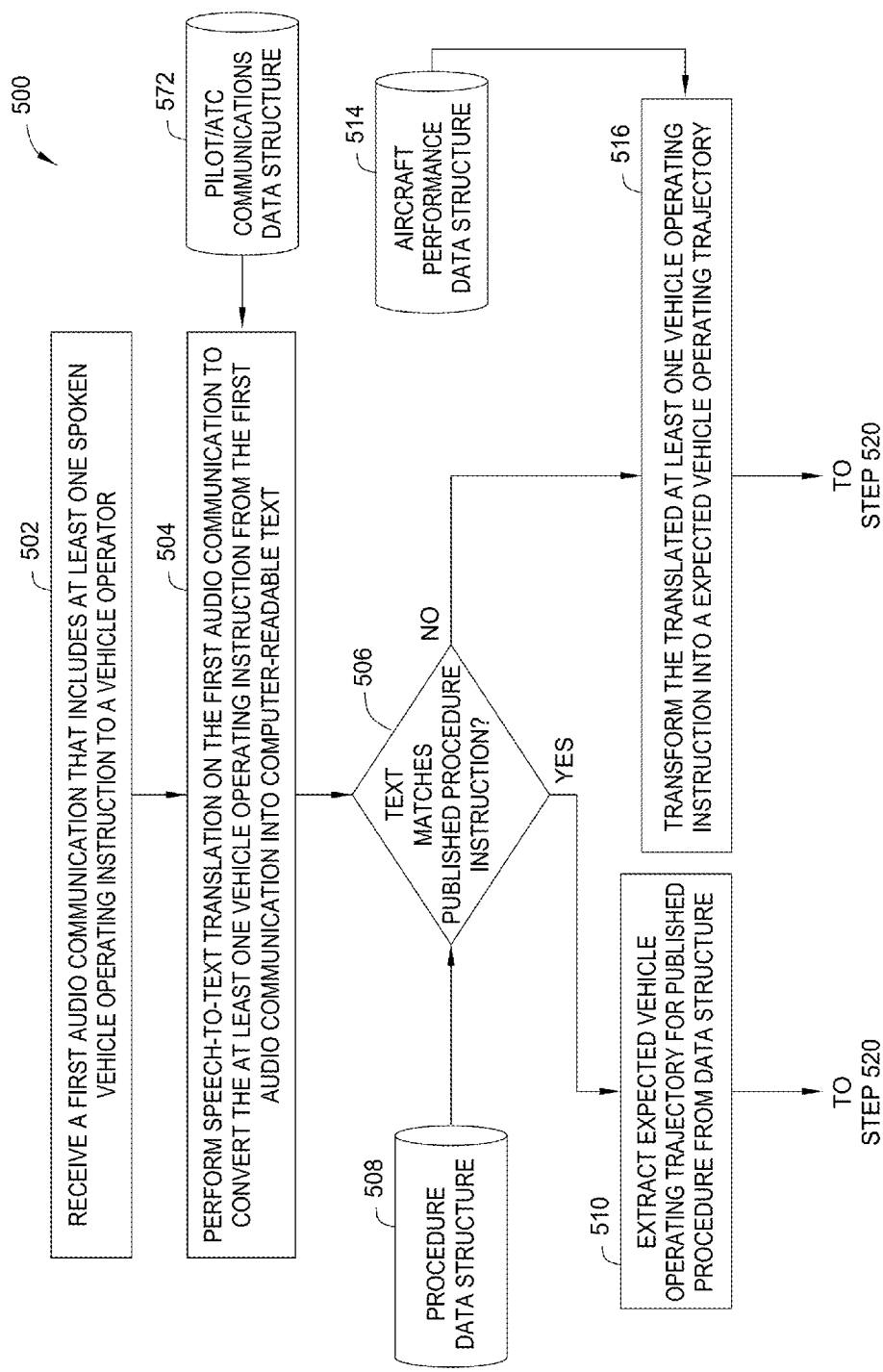
FIG. 5 is a flow chart for a method according to various aspects for monitoring vehicle operation compliance with a spoken vehicle operating instruction.
Figure 5:
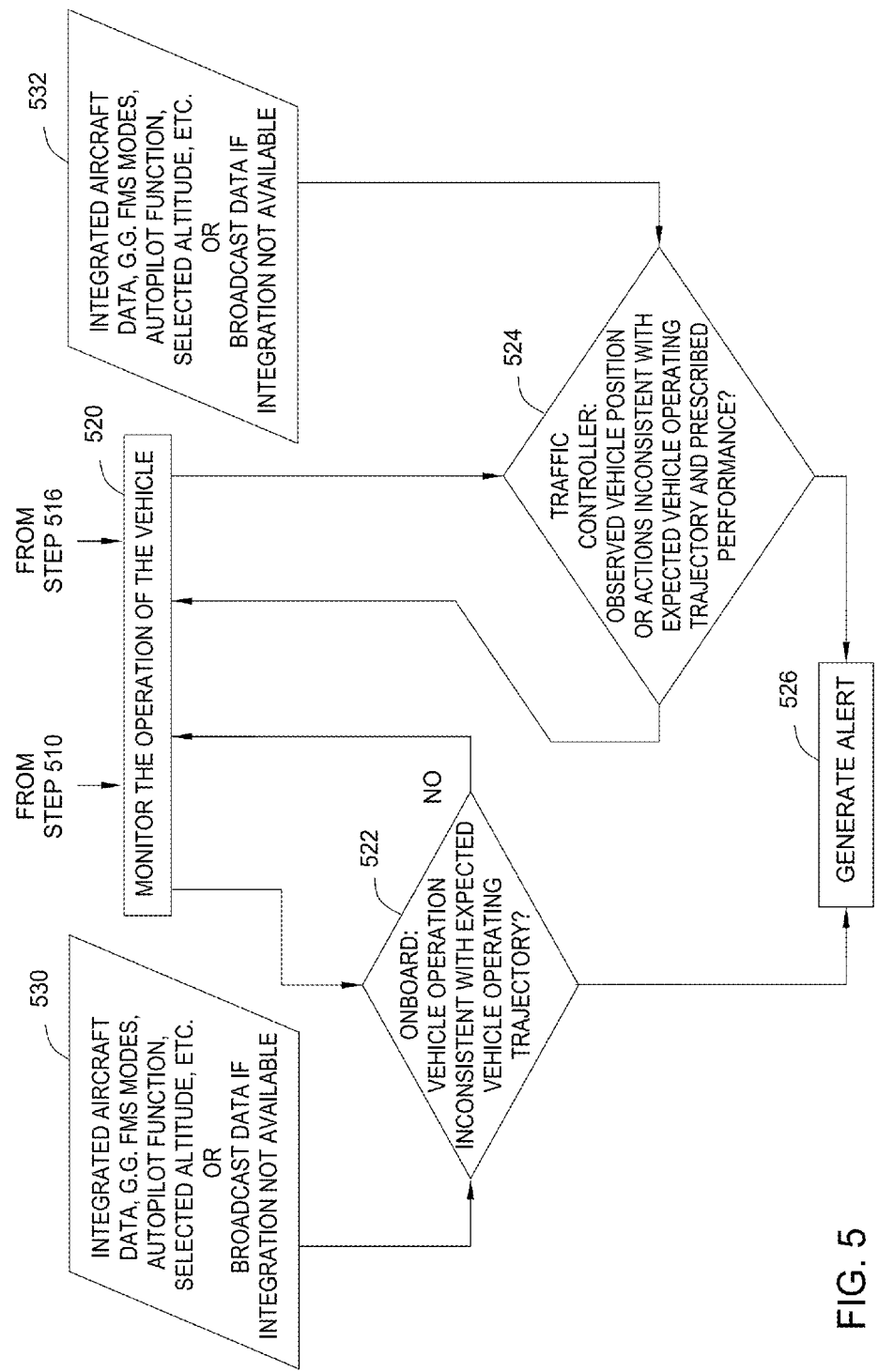

FIG. 5 illustrates a flow chart for a computer-implemented method 500 according to various aspects that automatically monitors compliance of a vehicle, such as an aircraft, with spoken vehicle operating instructions provided by a vehicle traffic controller. In block 502 of the method 500, a computer processor can receive a first audio communication that includes at least one spoken vehicle operating instruction to an operator of a vehicle. For example, the first audio communication could be the spoken vehicle operating instruction shown in the exemplary scenario 100 of FIG. 1. In block 504 of the method 500, the computer processor performs speech-to-text translation on the first audio communication to identify at least one vehicle operating instruction from the first audio communication. For example, the computer processor could use available speech-to-text software to translate the spoken vehicle operating instruction into computer-readable text. In applications such as air traffic control, air traffic controllers and pilots use a relatively small set of words and phrases to communicate. For example, the Aeronautical Information Manual, published by the Federal Aviation Administration (FAA), describes wording and phrasing conventions for pilots and air traffic controllers. By limiting various aspects of the speech-to-text software to recognizing words and phrases within the relatively small set (e.g., from a pilot/ATC communications data structure 512), the speech-to-text software could more accurately translate the spoken instructions into computer-readable text.

After the at least one spoken vehicle operating instruction is translated to computer readable text, in block 506, the computer processor can determine whether the computer-readable text of the spoken instruction matches a published procedure designation from a database. The computer processor can access a data structure (e.g., procedure data structure 508) that stores at least a subset of published procedures. For example, with reference to FIG. 4A, if the computer-readable text includes "RNP Z RWY 34L," then, in block 506, the computer processor could correlate the text associated with the RNP Z RWY 34L approach chart 400 from the data structure 508. In block 510, if the computer-readable text matches a published procedure, then the computer processor can extract the expected vehicle operating trajectory from the procedure data structure 508. As discussed above with reference to FIGS. 2, 3A-3B, and 4A-4E, the published procedures can set forth a precise path along which an aircraft is supposed to fly. The procedure data structure could include these paths as a series of latitudes, longitudes, altitudes, and airspeeds. The data structure 508 could also provide limitations on the path, such as being no lower than a specified altitude, or no faster than a specified airspeed. Alternatively or in addition, the procedure database could include these paths in the form of a center point for a turn and a specific radius for the turn. In either instance, the data point(s) for the procedure in the database can be extracted to form the expected vehicle operating trajectory in block 510. The data structure 508 could also define threshold values for path conformance. In block 520, the computer processor can monitor operation of the vehicle. For example, the computer processor could monitor the actual position of the aircraft relative to the identified three-dimensional positions associated with the expected vehicle operating trajectory. Alternatively or in addition, threshold values from the procedure data structure 508 could be used for monitoring.

Referring again to block 506, if the computer-readable text of the spoken instruction does not match a published procedure, then, in block 516, the computer processor transforms the computer-readable text of the spoken vehicle operating instruction into an expected vehicle operating trajectory. For example, with reference to FIG. 1, the computer processor can parse the vehicle operating instruction into an expected vehicle operating trajectory with two portions. A first portion of the expected vehicle operating trajectory extends from the current position of the aircraft at 2,000 feet to climb to the position 122 at which the aircraft is expected to reach 10,000 feet of altitude and traveling along the original heading of V In various aspects, the computer processor may assume that the aircraft 104 climbs to the position 122 at a constant rate. In various aspects, the computer processor may base the expected rate of climb for the aircraft 104 based on known performance characteristics of the aircraft 104. For example, aircraft often climb at slower rates at higher altitudes. If the aircraft 104 is a normally aspirated piston powered aircraft, for example, an altitude of 10,000 feet could be nearing the maximum operating altitude of the aircraft. If such an aircraft starts its climb at 2,000 feet, for example, it may be able to climb at 1,000 feet per minute. However, as the aircraft approaches 10,000 feet, it may only be able to climb at 100 feet per minute. By contrast, a large passenger jet may be able to climb through 10,000 feet at several thousand feet per minute. A second portion of the expected vehicle operating trajectory extends from the position 122 at which the aircraft is expected to reach 10,000 feet in a direction along the heading of 030° and at an airspeed of 250 knots. The computer processor could identify three-dimensional positions (e.g., latitude, longitude, and altitude) at which the aircraft should be located at discrete periods and/or windows of time based on the expected vehicle operating trajectory. After the computer processor has transformed the computer-readable text of the spoken vehicle operating instruction into an expected vehicle operating trajectory, in block 520, the computer processor can monitor operation of the vehicle. For example, the computer processor could monitor the actual position of the aircraft relative to the identified three-dimensional positions associated with the expected vehicle operating trajectory. As another example, the computer processor could monitor the actual position of the vehicle in a single dimension (e.g., a clearance may simply require the aircraft to stay above 3,000 feet).

FIG. 5 illustrates two types of monitoring that a computer processor could perform. In block 522, a computer processor on board the aircraft monitors performance of the aircraft relative to the expected vehicle operating trajectory. The computer processor on board the aircraft could use various available integrated aircraft data 530 for monitoring. The integrated aircraft data could include flight management system (FMS) modes, autopilot function, selected altitudes, and GPS data, for example. In other instances in which integrated aircraft data is not available, certain broadcast data could be used or certain data could be independently determined. For example, in aspects in which the computer processor is in a personal digital assistant (PDA) (e.g., a tablet computer), a GPS receiver built into the PDA could be used to determine a three-dimensional position of the aircraft, a heading, and a ground speed. In block 522, if the operation of the aircraft is consistent with the expected vehicle operating trajectory, then the computer processor returns to block 520 to continue monitoring. In block 522, if the operation of the aircraft is not consistent with the expected vehicle operating trajectory, then the computer processor generates an alert in block 526.

In block 524, a ground-based computer processor (e.g., a computer processor associated with a ground-based vehicle traffic controller) can observe operation of the vehicle via the various available surveillance systems discussed above. In addition, in block 532, in some instances, the ground-based computer processor could receive data from the aircraft (e.g., FMS modes, autopilot functions, selected altitude, and selected airspeed). The ground-based computer processor could also receive broadcast data from the aircraft (e.g., ADS-B broadcasts or Enhanced Surveillance information from a transponder). In block 524, if the operation of the aircraft is consistent with the expected vehicle operating trajectory, then the computer processor returns to block 520 to continue monitoring. In block 524, if the operation of the aircraft is not consistent with the expected vehicle operating trajectory, then the computer processor generates an alert in block 526.

Referring again to blocks 522 and 524, the computer processor can monitor operation of the vehicle relative to the identified three-dimensional positions associated with the expected vehicle operating trajectory, discussed above. In various aspects, the computer processor may allow for the vehicle operation to differ from the expected vehicle operating trajectory by a threshold amount before generating an alert in block 526. For example, referring again to FIG. 1, the spoken vehicle operating instruction could include an instruction to climb to 10,000 feet at a rate of 2,000 feet per minute. The computer processor could apply a 500 feet per minute threshold (e.g., set by the vehicle traffic controller), allowing the aircraft 104 to climb at a rate between 1,500 feet per minute and 2,500 feet per minute without generating an alert. In various aspects, the computer processor could calculate three-dimensional positions based on the assumed 2,000 feet per minute climb rate and also calculate three-dimensional positions based on the acceptable 1,500 feet per minute and 2,500 feet per minute climb rates. If the actual position of the aircraft 104 is between the three-dimensional positions based on the 1,500 feet per minute and 2,500 feet per minute climb rates, the computer processor does not generate an alert. In various aspects, the computer processor could establish a first threshold amount and a second threshold amount, wherein the second threshold amount is larger than the first threshold amount. In such aspects, alerts may not be generated if the aircraft is operating outside of the boundaries established by the first threshold, but is within the boundaries of the second threshold and aircraft intent data indicates that the aircraft is correcting its deviations from the expected vehicle operating trajectory. Continuing the example above, the first threshold amount could be based on the 1500 feet per minute to 2500 feet per minute climb rate window discussed above. The second threshold amount could be slightly larger. For example, the second threshold amount could be set based on a 1,000 feet per minute difference in climb rate, allowing for the aircraft to climb at a rate between 3,000 feet per minute and 1,000 feet per minute so long as the intent data indicates that the aircraft is correcting its deviations. As an exemplary illustration, if the aircraft is climbing at a rate of 1,250 feet per minute but aircraft intent data indicates an increasing climb rate, then the computer processor may suppress the alert. As another example, if the aircraft is climbing at a rate of 2,750 feet/minute but aircraft intent data indicates a decreasing climb rate, then the computer processor may suppress the alert. If the monitored aircraft position falls outside of the second threshold amount relative to the expected vehicle operating trajectory, then the processor could raise an alert regardless of vehicle intent.

Referring to the second portion 120 of the expected vehicle operating trajectory, the computer processor expects the aircraft to fly along the heading of 030° at an altitude of 10,000 feet and at a speed of 250 knots. The computer processor could apply user-settable threshold amounts (e.g., set by an air traffic controller) about each of these parameters of the second portion 120 of the expected vehicle operating trajectory and generate an alert if the aircraft 104 exceeds any of these thresholds. For example, a threshold amount of 5° could be set with respect to the aircraft heading. That is, the computer processor would not generate an alert if the aircraft is flying on a heading of between 25° and 35°. As another example, a threshold amount of 100 feet could be set with respect to the altitude assignment. That is, the computer processor would not generate an alert if the aircraft is flying between 9,900 feet and 10,100 feet. As another example, a threshold amount of 10 knots could be set with respect to the airspeed assignment. That is, the computer processor would not generate an alert of the aircraft is flying between 240 knots and 260 knots. Again, as discussed above, in various aspects, the computer processor could set first threshold amount(s) and second threshold amount(s), and the computer processor could suppress an alert if the aircraft operates outside of the first threshold amount(s), but inside of the second threshold amount(s), if aircraft intent data indicates that the aircraft is correcting its deviations from the expected vehicle operating trajectory. For example, the computer processor could set a first threshold amount of 5° with respect to the aircraft heading and a second threshold amount of 10°. If the aircraft is on a heading of 022° instead of the expected 030°, the computer processor could suppress an alert if aircraft intent data indicates that the aircraft is banking to the right toward a heading of 030°. Similarly, the alert could be generated more quickly if intent data indicates that the aircraft will be out of conformance in the future and cannot recover without first being out of conformance. As another example, the computer processor could set a first threshold amount of 100 feet with respect to the altitude assignment and a second threshold amount of 200 feet. If the aircraft is at an altitude of 9,850 feet (150 feet away from the assigned altitude), the computer processor could suppress an alert if aircraft intent data indicates a return to the assigned altitude, and the aircraft is still within conformance limits. As another example, the computer processor could set a first threshold amount of 10 knots with respect to the airspeed assignment and the second threshold amount of 20 knots. If the aircraft is flying at an airspeed of 235 knots, the computer processor could suppress an alert if aircraft intent data indicates a return to the assigned speed, and the aircraft is still within conformance limits.

The SIDs, STARs, RNP approaches, and other published procedures provide an opportunity quickly identify an expected trajectory for an aircraft. For example, referring again to FIG. 2, an air traffic controller could clear an aircraft for takeoff from runway 16L 202 and instruct the aircraft to follow the ELMAA ONE departure to the HOQUIAM VOR. In block 206, the computer processor could retrieve the ELMAA ONE departure procedure and/or a trajectory associated with the ELMAA ONE departure procedure in a data structure, such as a database. The expected trajectory associated with the ELMAA ONE departure could be loaded by the computer processor as an expected vehicle operating trajectory.

In the case of published procedures (e.g., the SIDs, STARs, and RNP approaches discussed above with reference to FIGS. 2, 3, and 4A-4E) and certain published airspace designations (e.g., "RNP 1 airspace"), the published procedures or airspace designations may establish threshold limits. For example, referring to FIG. 4C, for an aircraft to use the RNP approach chart 450 for runway 34C 456 at SEA 412, the aircraft must be within 0.3 nautical miles of the published track from the SHIPZ waypoint 402 (see reference number 474). Thus, a threshold limit of 0.3 nautical miles could be used for monitoring an aircraft flying these portions of the RNP approach to runway 34C at SEA.

Figure 4E:
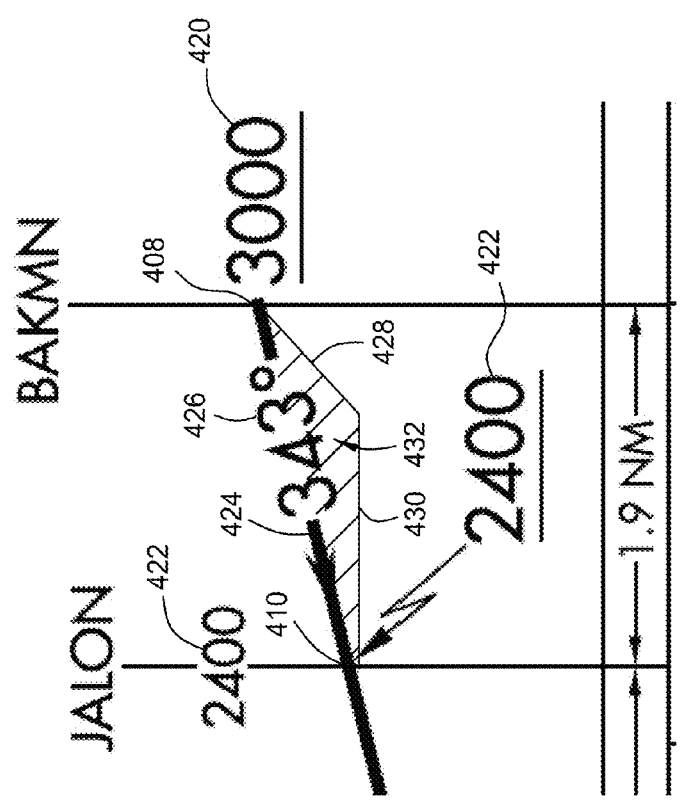
FIG. 4E is a second detail view of the exemplary RNP approach chart shown in FIG. 4A.

Certain published procedures may allow different aircraft to perform the procedures in different manners. Referring to FIGS. 4A and 4E, the approach chart 400 for the RNP Z approach for runway 34L limits the descent of the aircraft to an altitude at or above 3,000 feet 420 at the BAKMN waypoint 408 and to an altitude at or above 2,400 feet 422 at the JALON waypoint 410. The approach chart 400 illustrates a constant three degree descent path 424 on a heading of 343° 426. However, an aircraft may still meet the constraints by flying a steeper descent path 428 (to arrive at the 2,400 foot altitude before reaching the JALON waypoint 410) and then flying straight and level path 430 at 2,400 feet to reach the JALON waypoint 410. In such instances, the aircraft could be located anywhere in the cross-hatched area 432. Put differently, the cross-hatched area 432 could represent a threshold area along the 343° heading in which the aircraft could be located without causing an alert to be generated.

In various aspects, vehicle monitoring could involve using additional information to determine whether a vehicle is being operated in conformance with a spoken vehicle operating instruction. As discussed above, certain aircraft are equipped with transceivers that can provide intent information, such as bank angle information, about the aircraft. Referring again to FIGS. 4A-4D, as discussed above, the curved approach for runway 34L at SEA includes a tighter turn than the similar curved approach for runway 34C. A monitoring system that is solely based on radar returns to determine the actual trajectory of an aircraft may not be able to determine whether an aircraft is following the curved approach for runway 34L or the curved approach for 34C until the aircraft is almost lined up with runway 34L or 34C. However, by monitoring bank angle (e.g., from transmission from an aircraft transceiver) of the aircraft, it may be possible to determine that an aircraft is not following the spoken vehicle operating instruction before their position alone would show this. For example, a first bank angle may be necessary to follow the curved approach for runway 34C and a second, steeper bank angle may be necessary to follow the tighter curved approach for runway 34L. If a monitored aircraft has established a bank angle commensurate with the curved approach for runway 34L when the aircraft is supposed to be on the curved approach for runway 34C, then an alert could be generated. Similarly, if a monitored aircraft has established a bank angle commensurate with the curved approach for runway 34C when the aircraft is supposed to be on the curved approach for runway 34L, then an alert could be generated.

The generated alerts (in block 526) can be provided in one of several ways. For example, an icon that represents the aircraft on a display screen could be altered to stand out from amongst other aircraft icons. For example, the generated alert could cause the icon to blink on and off. Alternatively, the generated alert could cause the icon to bloom in brightness on the display screen. As another example, the generated alert could add a textual warning and/or a warning icon (e.g., an exclamation mark) to the icon that represents the aircraft. As another example, the generated alert could include an audible component, such as the beep, siren, klaxon, or the like to alert the air traffic controller. In various aspects, the computer processor could generate a text based message that identifies the aircraft that is not operating in compliance with its expected vehicle operating trajectory and/or that identifies the nature of the noncompliance. The computer processor could display the text based message on a display screen and/or could perform a text to speech operation and output the speech through an audio transducer (e.g., a speaker) for the air traffic controller to hear.

The generated alerts in block 526 can be provided to a vehicle operator in one of several ways. For example a navigation or route display could be altered to stand out from the flown route or the route programmed in the FMS to identify discrepancies, either forecast or historical. Alternatively, the generated alert could cause the cleared route to change in brightness or appear on the display screen. As another example, the generated alert could add a textual warning and/or a warning icon (e.g., an exclamation mark) to the element of the non-conforming route. As another example, the generated alert could include an audible component, such as a beep, siren, klaxon, or the like to alert the pilot. In various aspects, the computer processor could generate a text-based message that identifies the aircraft that is not operating in compliance with the cleared vehicle operating trajectory and/or that identifies the nature of the non-compliance. The computer processor could display the text-based message on a display screen and/or could perform a text-to-speech operation and output the speech through an audio transducer (e.g., a speaker) for the pilot to hear.

In various instances, the computer processor monitoring the spoken vehicle operating instructions may not be able to prepare entries for a vehicle management computer, as described above. However, the computer processor could monitor entries into the vehicle management computer to ensure that the entries are correct, based on the spoken vehicle operating instructions. For example, referring to FIGS. 4A and 4C, a spoken vehicle operating instruction from an air traffic controller could instruct an aircraft to follow the RNP Z approach for runway 34L. However, if the pilot(s) mistakenly select the RNP Z approach for runway 34C in the FMS, a computer processor onboard the aircraft could output an alert to the pilot(s). Additionally, in various aspects, the computer processor on board the aircraft could output the alert to the air traffic controller via a radio broadcast, a data transceiver (such as an ADS-B transceiver or the like), or other communication path. In various aspects, the computer processor on board the aircraft and/or the FMS could transmit entries to the FMS to the air traffic controller. A computer processor on the ground could compare the spoken vehicle operating instruction (translated to computer-readable text in blocks 502, 504, and 506) to the transmitted entries to the FMS. In the event the entries to the FMS do not match the spoken vehicle operating instruction, the ground-based computer processor could issue an alert.

In various instances, the spoken vehicle operating instruction may not include sufficient information for the computer processor to properly identify the published procedure such that the computer processor can retrieve and load an expected vehicle operating trajectory. For example, with reference to FIG. 4A, a spoken vehicle operating instruction from air traffic controller at SEA may be "N16HR, you are cleared for the RNP Z approach to runway 34 left." The instruction does not identify the airport. Without more information, the instruction could potentially apply to any airport with a runway having a 34L designation. In various aspects, the computer processor could use other data to identify the proper procedure. For example, the computer processor could determine the radio frequency being used to transmit the spoken vehicle operating instruction and identify the airport based on the frequency being used. As another example, the computer processor could use a determined location of the aircraft (e.g., a Global Positioning System provided location or an Inertial Navigation System (INS) provided location) to identify the airport.

Figure 6:
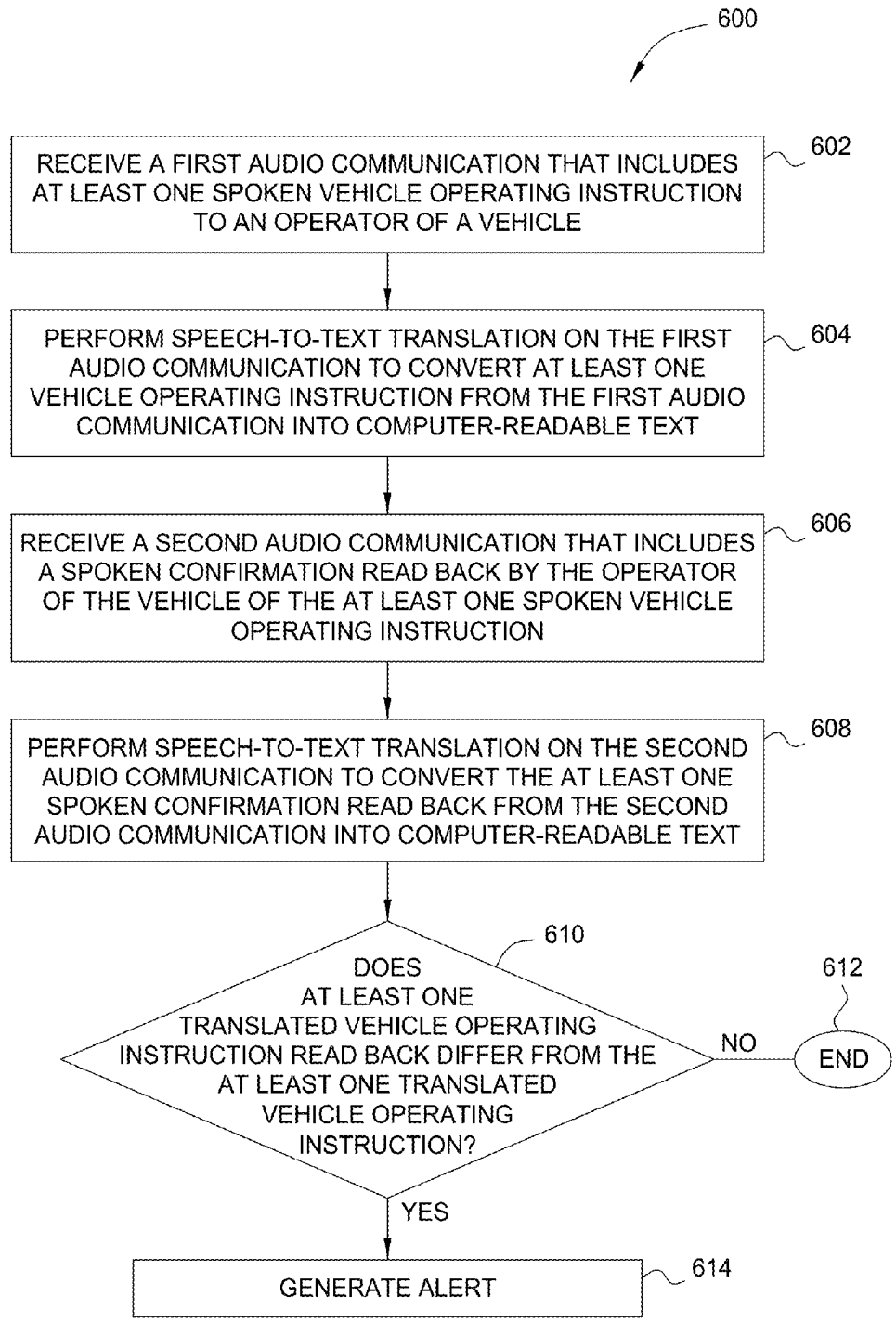
FIG. 6 is a flow chart for a method according to various aspects for monitoring accuracy of a spoken confirmation readback by a vehicle operator responsive to a spoken vehicle operating instruction from a vehicle controller.

In various instances, an air traffic controller (or other vehicle traffic controller) may provide a spoken vehicle operating instruction and the aircraft pilot (or other vehicle operator) may incorrectly read back the instruction. For example, the aircraft pilot could have misheard the spoken instruction and/or incorrectly remembered the spoken instruction. In other instances, the aircraft pilot could have heard and remembered the spoken instruction correctly but simply misstated the read back. Regardless of the cause, discrepancies between a spoken instruction and a read back should be clarified by the air traffic controller and/or the pilot. In many instances, the air traffic controller and/or the pilot will catch such discrepancies but occasionally may not do so. Referring now to FIG. 6, a computer processor may follow a method 600 to compare a spoken vehicle operating instruction (e.g., from an air traffic controller to a pilot of an aircraft) and a spoken confirmation read back of the spoken vehicle operating instruction e.g., from the pilot of the aircraft to the air traffic controller). In the event that the spoken confirmation read back differs from the spoken vehicle operating instruction, the computer processor can generate an alert. In block 602 of the method 600, the computer processor receives a first audio communication that includes at least one spoken vehicle operating instruction to an operator of the vehicle. In block 604, the computer processor can perform speech-to-text translation on the first audio communication to convert the at least one vehicle operating instruction from the first audio communication into computer readable text. In various aspects, blocks 602 and 604 can be performed in a similar manner to blocks 502 and 504 of the method 500 discussed above with respect to FIG. 5. In block 606, the computer processor receives a second audio communication that includes a spoken confirmation read back of the at least one spoken vehicle operating instruction by the operator of the vehicle. In block 608, the computer processor can perform speech-to-text translation on the second audio communication to convert the at least one spoken confirmation read back from the second audio communication into computer readable text. In various aspects, blocks 606 and 608 can be performed in a similar manner to blocks 502 and 504 of the method 500 discussed above with respect to FIG. 5.

In block 610, the method 600 can compare the translated at least one vehicle operating instruction to the translated at least one confirmation read back. If the translated at least one vehicle operating instruction differs substantially from the at least one confirmation read back, then the processor can generate an alert in block 614. If the translated at least one vehicle operating instruction does not differ substantially from the at least one confirmation read back, then the method 600 can end at block 612. As discussed above, in many instances, the spoken confirmation read back does not repeat, word for word, the spoken vehicle operating instruction. In many instances, the vehicle operator may only repeat key phrases of the vehicle operating instruction. In various instances, the vehicle operator may only respond with their call sign (e.g., "six hotel romeo" from FIG. 1) or respond with a simple acknowledgement (e.g., "ROGER" or "WILCO"). In various aspects, the computer processor could determine whether the translated vehicle operating instruction and the translated confirmation read back are sufficiently similar by performing a matching test. In the matching test, if the translated confirmation read back includes key elements of the translated vehicle operating instruction, then the computer processor could determine that the translated vehicle operating instruction in the translated confirmation read back are substantially similar, and the computer processor would not generate an alert. For example, commonly-expected phraseology will match some portions or all of the details in a clearance. Referring to the exemplary scenario in FIG. 1, the confirmation readback 110 includes a portion of the call sign of the aircraft, and also includes "climb to", "one zero thousand," "right," "turn," "zero three zero," "speed," and "two five zero knots." These words and phrases are all included in the vehicle operating instruction, so there is significant overlap in a computer processor could determine that translated vehicle operating instruction in the translated confirmation read back are substantially similar. If the pilot incorrectly speaks the confirmation read back (e.g., refers to a heading of 040 and/or a speed of 260 knots), then the mismatch of key elements could cause the computer processor to determine that the translated vehicle operating instruction and the translated confirmation read back are not substantially similar. As a result, the computer processor could generate the alert in block 614. If sufficient key elements are not identified (e.g., the confirmation read back only includes "ROGER") and correctness cannot be asserted or rejected, the computer processor could suppress alerts to minimize controller and vehicle operator workload.

In various aspects, the computer processor could determine whether the translated vehicle operating instruction and to the translated confirmation read back are substantially similar by isolating numerals and phonetic identifiers for letters in the translated vehicle operating instruction and confirmation read back and determine whether those isolated numerals and phonetic identifiers match. For example, referring again to FIG. 1, an air traffic controller would speak the call sign of the aircraft 104 (N16HR) as "November One Six Hotel Romeo" and the pilot would respond by speaking "One Six Hotel Romeo." "November," "Hotel," and "Romeo" are phonetic identifiers for the letters "N," "H," and "R," respectively. In many instances, the most important details of the vehicle operating instruction will be described in numbers and/or phonetic identifiers. Thus by isolating the phonetic identifiers in the translated vehicle operating instruction in the translated confirmation read back, the comparison process performed by the computer processor can be simplified and the accuracy may be increased.

In various instances, the computer processor may not be able to understand the first audio communication and/or the second audio communication. For example, a pilot's spoken confirmation of a control instruction may be garbled by static to the point that speech-to-text translation fails. As another example, a pilot's spoken confirmation may not include sufficient information for the computer processor to match the spoken confirmation to the spoken vehicle operating instruction. In such instances, the computer processor could output an alert. However, in many such instances, the vehicle traffic controller and the vehicle operator did communicate properly. Thus, an alert could be burdensome for the vehicle traffic controller. In instances in which a spoken communication is missed for some reason, the computer processor could output a caution instead of an alert. The caution could indicate to the vehicle traffic controller that the computer processor has not been able to track all commands. For example, when an air traffic controller broadcasts a vehicle operating instruction to an aircraft, the computer processor could draw a broken-line circle around an icon for the aircraft on a display screen used by the air traffic controller. The broken-line caution around the icon could indicate a caution. When the pilots respond with a spoken confirmation, if the computer processor can identify the spoken confirmation with the aircraft and the spoken confirmation is correct, then the broken-line circle could be removed. If the computer processor cannot identify a spoken confirmation with the aircraft, then the computer processor could leave the broken line circle on the display screen. The lingering broken-line circle could act as a warning for the air traffic controller that the computer processor could not identify a spoken confirmation for the spoken vehicle operating instructions issued by the controller. If the computer processor can identify the spoken confirmation, but the spoken confirmation read back is incorrect (e.g., the pilot(s) of an aircraft read back the wrong heading, altitude, or published procedure), then the computer processor could remove the broken-line circle and cause the icon for the aircraft to flare (e.g., momentarily and/or periodically increase in brightness on the screen). The flare could be an alert to the air traffic controller that the spoken vehicle operating instructions were misunderstood or that the conformation read back was misspoken. The above-described broken-line circle and flare for a caution and warning, respectively, is merely one example for illustration purposes. Other symbols, colors, sounds, or the like could be used to signal a caution and an alert.

Figure 7A:
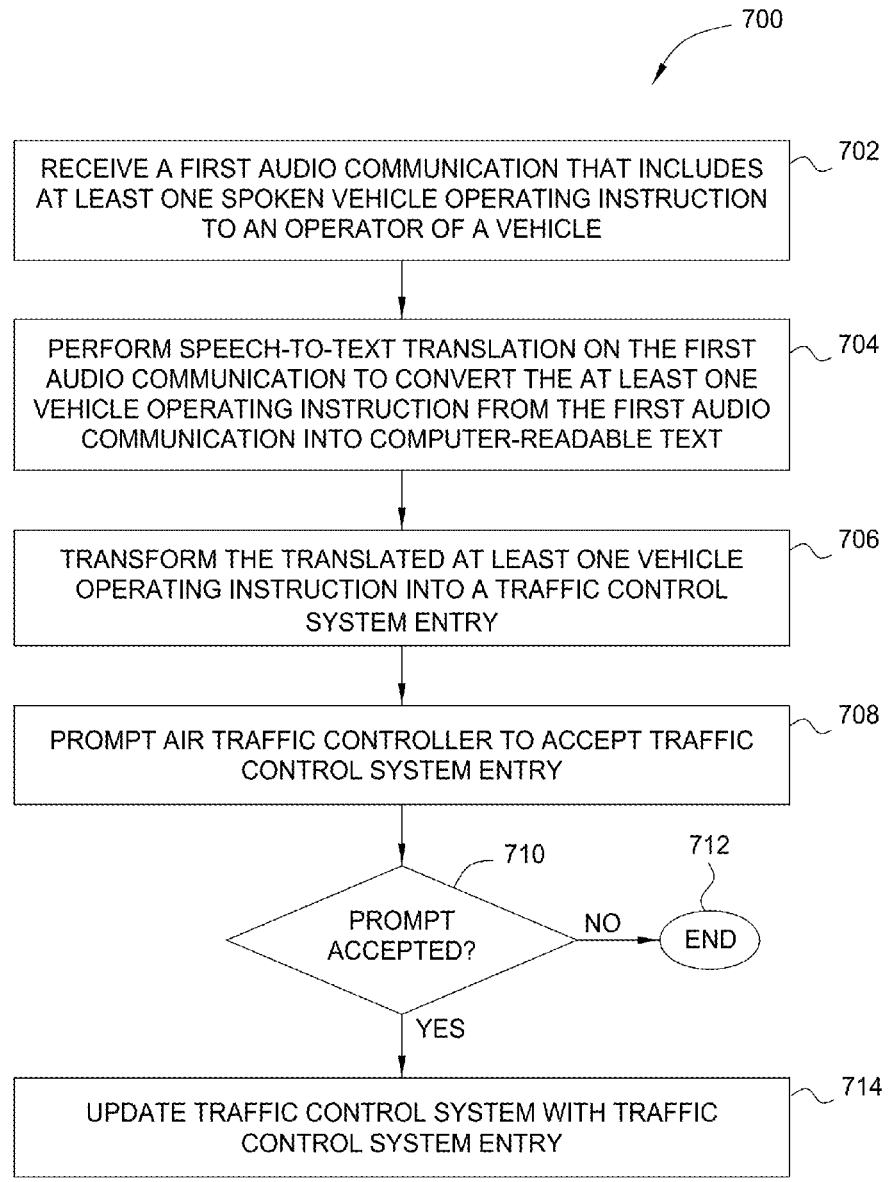
FIG. 7A is a flow chart for a method according to various aspects for generating a scratch pad entry for an air traffic controller based on a spoken vehicle operating instruction from the air traffic controller.

In many instances, air traffic controllers have access to an air traffic control system that includes a system (e.g., a "scratch pad") on which an air traffic controller can enter information about the instructions (i.e., clearances) that have been provided to different aircraft in the air traffic controller's region of control. In some instances, an air traffic controller can annotate a "hand off" with a data entry to the next air traffic controller handling a particular aircraft. However, when an aircraft receives new instructions from an air traffic controller, the instructions for the aircraft stored in the air traffic control system may not be updated and can become out of date and obsolete. In various aspects, the estimated vehicle operating trajectory could be used to form an updated data entry for the air traffic control system, or to provide an alert that a data entry and verbal clearance do not match. Referring now to FIG. 7A, in various aspects, a computer processor can perform a method 700 to automatically provide an air traffic controller with an updated data entry for an air traffic control system, based on a spoken vehicle operating instruction to an aircraft. The data entry could be presented to the air traffic controller with a prompt. If the air traffic controller accepts the prompt, then the computer processor could enter the updated data entry into the air traffic control system.

In block 702, the computer processor can receive a first audio communication that includes at least one spoken vehicle operating instruction to an operator of the vehicle. In block 704, the computer processor can perform speech-to-text translation on the first audio communication to convert the at least one vehicle operating instruction from the first audio communication into computer readable text. In various aspects, blocks 702 and 704 of the method 700 can be similar to blocks 502 and 504 of the method 500 described above with respect to FIG. 5. In block 706, the computer processor can transform the translated at least one vehicle operating instruction into a data entry. In block 708, the data entry can be presented to the vehicle traffic controller (e.g., on a computer display screen) with a prompt. In block 710, if the vehicle traffic controller accepts the prompt, then the computer processor can enter the data entry into the scratchpad in block 714. In block 710, if the vehicle traffic controller does not accept the prompt, then the method 700 can end at block 712.

Figure 7B:
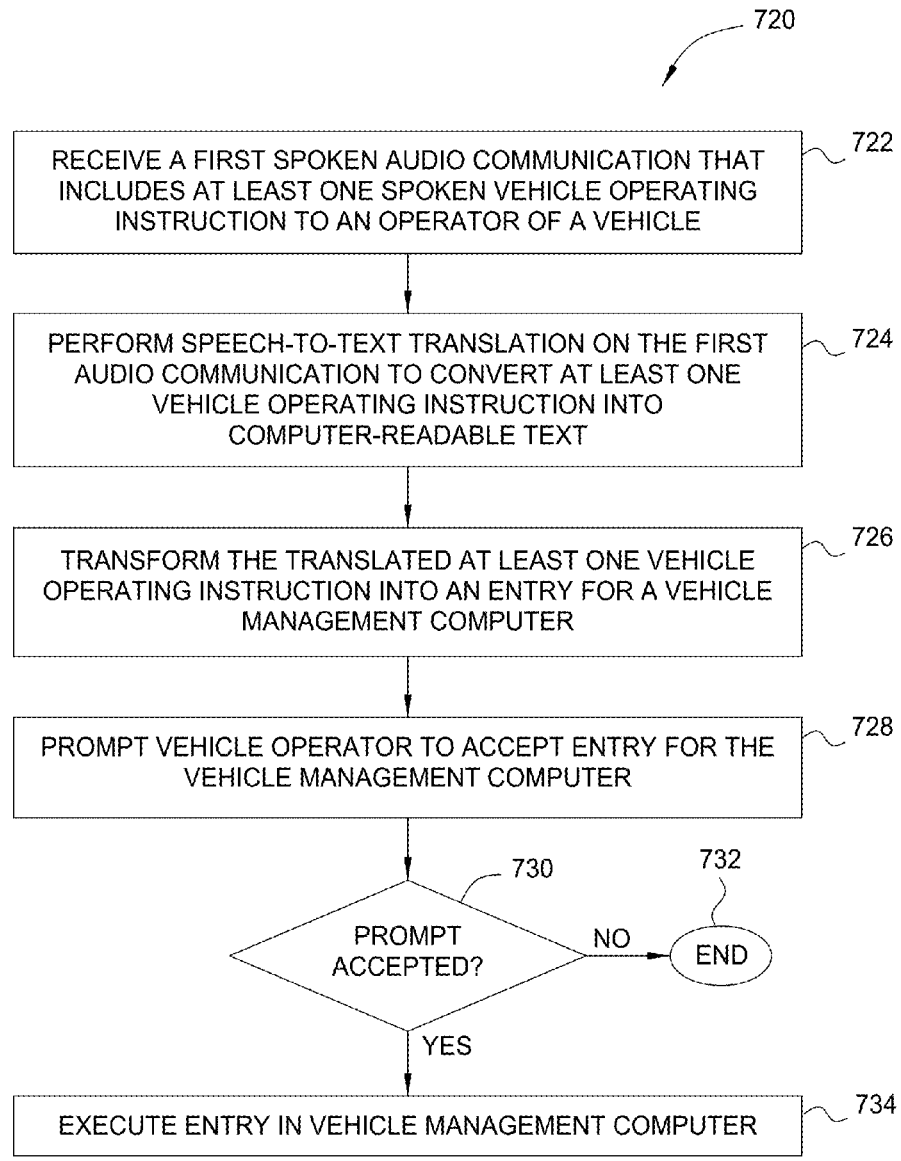
FIG. 7B is a flow chart for a method according to various aspects for generating an entry for a vehicle management computer based on a spoken vehicle operating instruction from the vehicle traffic controller.
Figure 8:
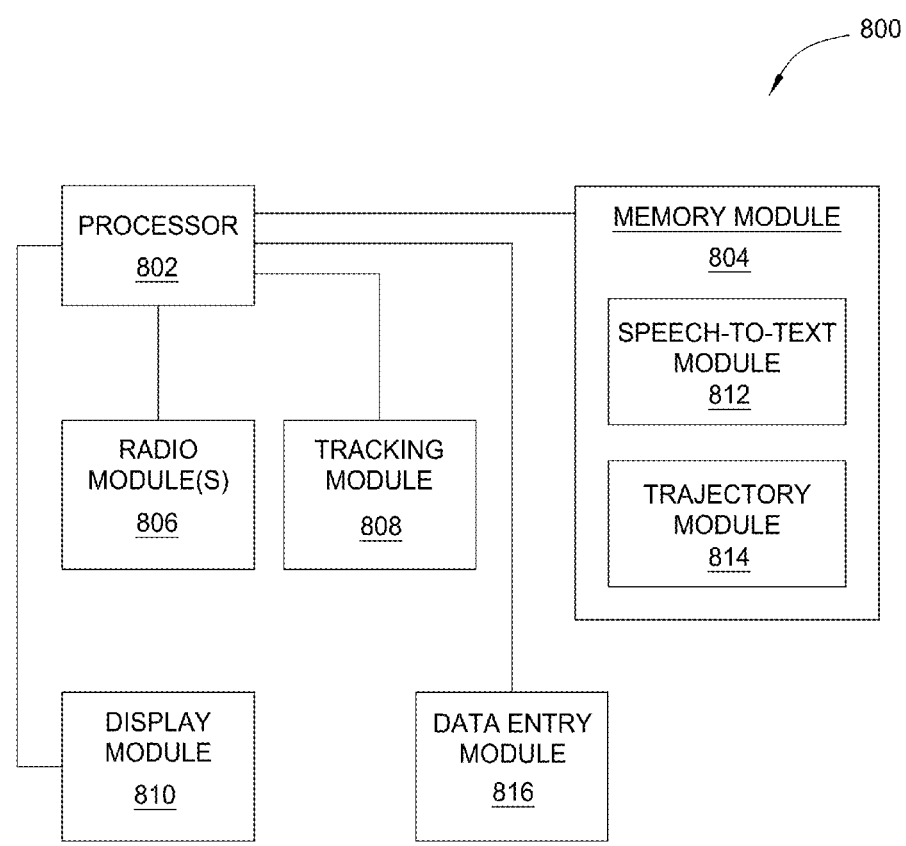
FIG. 8 is a block diagram of a system according to various aspects for monitoring vehicle operation compliance with a spoken vehicle operating instruction.

In instances in which a vehicle may be controlled in accordance with a vehicle management computer or other navigation and guidance systems, aspects described herein could create entries for the vehicle management computer, navigation, or guidance systems based on spoken vehicle traffic instructions. For example, aircraft are often flown by an autopilot system that follows a flight plan entered in an FMS. The flight plan can include a lateral path (e.g., latitudes and longitudes and/or waypoints that the aircraft will fly through), a vertical path (e.g., target altitudes along the lateral path), and airspeeds. In the event a spoken vehicle operating instruction differs from the entered flight plan, a pilot would enter the changes in the FMS. FIG. 7B is a flow chart for a method 720 that could be implemented by a computer processor to provide the pilot (or other vehicle operator) with an entry for a vehicle management computer based on a spoken vehicle operating instruction. In block 722, the computer processor can receive a first audio communication that includes at least one spoken vehicle operating instruction to an operator of the vehicle. In block 724, the computer processor can perform speech-to-text translation on the first audio communication to convert the at least one vehicle operating instruction from the first audio communication into computer readable text. In various aspects, blocks 722 and 724 of the method 700 can be similar to blocks 502 and 504 of the method 500 described above with respect to FIG. 5. In block 726, the computer processor can transform the translated at least one vehicle operating instruction into an entry for a vehicle management computer. For example, in the event that a spoken vehicle operating instruction from an air traffic controller includes a heading or altitude restriction, in block 726, the computer processor could automatically generate an entry into the FMS for the aircraft that makes the change to the flight plan in the FMS. As another example, in a flight management system, at least some published procedures are stored in memory and accessible through a menu system. For example, in the event, an aircraft is instructed to fly the RNP Z approach to runway 34L (see FIG. 4A), the pilot would access a sequence of menus to first access the approach options for SEA and then select the RNP Z approach for runway 34L. In various instances, in block 726, the computer processor could automatically select the RNP Z approach for runway 34L based on a spoken vehicle operating instruction for the aircraft to use the approach. As another example, in block 726, the computer processor could automatically select the ELMAA ONE departure based on a spoken vehicle operating instruction for the aircraft to use that SID. In block 728, the computer processor can prompt a vehicle operator to accept the entry for the vehicle management computer and execute it as the active route. For example, the entry may be displayed on a computer display screen associated with a FMS or route planner and an "execute" button can be illuminated. In block 730, the computer processor can determine whether the vehicle operator accepted the entry. Continuing the above example, if the pilot pushes the "execute" button, then in block 734, the flight plan could be updated based upon the entry generated by the computer processor. In the event the vehicle operator does not accept the entry (e.g., if a pilot pushes a "clear" button on the FMS), then the method 720 ends at block 732. FIG. 8 illustrates a block diagram of a system 800 according to various aspects. The system 800 includes a processor 802 and a memory module 804. The memory module 804 can include a speech-to-text module 812 that can translate spoken words into computer readable text, as described above. The memory module 804 can also include a trajectory module 814 that can calculate an expected vehicle operating trajectory based on the current vehicle position and translated vehicle operating instructions, discussed above. The system 800 can also include a radio module 806. The radio module 806 can receive radio transmissions from the vehicle traffic controller and/or from vehicle operators that include spoken vehicle operating instructions and spoken confirmation read backs, respectively. In instances where the system 800 is co-located with a vehicle traffic controller, the radio module 806 could be in communication with a microphone used by the vehicle traffic controller to communicate the spoken vehicle operating instructions. The radio module 806 could also be in communication with a radio antenna used to receive radio broadcasts from the vehicle that include the spoken confirmation read backs. In various aspects, discussed in greater detail below, the system 800 could be located on board an aircraft (e.g., the aircraft 104 shown in FIG. 1). In such aspects, the radio module 806 could be in communication with a microphone used by the pilot to communicate the spoken confirmation read backs to the air traffic controller. Also, in such aspects, radio module 806 could also be in communication with a radio antenna used to receive radio broadcasts from the air traffic controller that include the spoken vehicle operating instructions.

The system 800 can also include a tracking module 808 that can track the positions of vehicles. As discussed above, in the context of air traffic, the tracking module could include one or more surveillance systems, feeds from one or more surveillance systems, ADS-B transceiver, or the like. In various aspects in which the system 800 is located on board an aircraft, the aircraft may have onboard surveillance, a traffic collision avoidance system (TCAS), and an ADS-B transceiver, or the like. The system 800 can also include a display module 810 that can display, among other things, alerts generated by the processor 802, as described above. The system 800 could also include a data entry module 816 (e.g., a scratch pad entry module or an FMS entry module). As discussed above, in various aspects, the system 800 could automatically prepare data based on spoken vehicle operating instructions and could enter the data into the surveillance system upon receiving a prompt from the vehicle traffic controller.

In various circumstances, aircraft in a region of airspace receive spoken instructions for all aircraft in the region. For example, all aircraft in a particular traffic control region (e.g., controlled airspace surrounding an airport) may be using the same radio frequency to communicate with the air traffic controller. In such instances, a computer system on board a subject aircraft could form expected vehicle operating trajectories for the subject aircraft and for other aircraft in the traffic control region. The computer system could monitor the operation of the subject aircraft relative to its own expected vehicle operating trajectory and alert the pilot(s) if the vehicle operation differs from the expected vehicle operating trajectory by more than a threshold amount. Additionally, the computer system could monitor the operation of the other aircraft (e.g., using ADS-B, a traffic collision avoidance system (TCAS), and/or on-board radar) relative to the respective expected vehicle operating trajectories for the other aircraft. In the event that the operation of one or more of the other aircraft differs from the respective expected vehicle operating trajectories, an alert can be provided to the pilot(s) of the subject aircraft. In various aspects, an alert is only provided to the pilot(s) of the subject aircraft if the other aircraft that is operating differently than its expected vehicle operating trajectory is within a threshold distance of the subject aircraft.

In addition to aircraft, aspects described herein could be used with other forms of vehicle operation. For example, aspects could be used with respect to operation of locomotives, ships and/or boats operating in harbors, or vehicle traffic in a warehouse.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects may take the form of an entirely hardware aspect, an entirely software aspect (including firmware, resident software, micro-code, etc.) or an aspect combining software and hardware aspects that may all generally be referred to herein as a "circuit," "module" or "system."

The aspects described herein may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. For example, a user may access applications (e.g., speech-to-text translation applications) or related data available in the cloud. For example, the speech-to-text translation aspect could execute on a computing system in the cloud and provide the computer-readable vehicle operation instruction and/or computer-readable confirmation readback to a system being used by a vehicle traffic controller. In such a case, the speech-to-text aspect could translate a spoken vehicle operating instruction and/or a spoken confirmation readback into a computer-readable vehicle operating instruction and/or computer-readable confirmation readback, respectively, and store the computer-readable vehicle operating instruction and/or computer-readable confirmation readback at a storage location in the cloud. Doing so allows a user to access this information from any computing system attached to a network connected to the cloud (e.g., the Internet).

While the foregoing is directed to aspects of the present invention, other and further aspects of the invention may be devised without departing from the basic scope thereof, and the scope thereof is determined by the claims that follow.

What is claimed is:

1. A computer-implemented method, comprising:
  receiving a first audio communication that includes at least one spoken vehicle operating instruction to an operator of a vehicle;
  performing speech-to-text translation on the first audio communication, using a computer processor, to convert at least one spoken vehicle operating instruction from the first audio communication into at least one computer-readable vehicle operating instruction;
  transforming the at least one computer-readable vehicle operating instruction into a first expected vehicle operating trajectory for the vehicle, using the computer processor;
  monitoring operation of the vehicle; and
  upon the monitored operation of the vehicle differing from the expected vehicle operating trajectory by a first threshold amount, providing a first alert.

2. The method of claim 1, further comprising:
  receiving a second audio communication that includes at least one spoken confirmation readback by the operator of the vehicle;
  performing speech-to-text translation on the second audio communication, using the computer processor, to convert the at least one spoken confirmation readback from the second audio communication into at least one computer-readable confirmation readback; and
  upon the at least one computer-readable confirmation readback differing in key elements from the at least one computer-readable vehicle operating instruction, providing a second alert.

3. The method of claim 2, wherein the first audio communication is an instruction from an air traffic controller to one aircraft among a plurality of aircraft, wherein the first audio communication includes a first call sign for the aircraft, wherein the second audio communication includes a second vehicle call sign, and wherein the method determines whether the at least one computer-readable confirmation readback in the second audio communication differs from the at least one computer-readable vehicle operating instruction in the first audio communication if the first call sign at least partially matches the second call sign.

4. The method of claim 1, wherein the first audio communication is an instruction from an air traffic controller to an aircraft, and wherein the method further comprises:
  transforming the at least one computer-readable vehicle operating instruction into a data entry for an air traffic control system;
  providing an acceptance prompt to the air traffic controller; and
  upon receiving an affirmative response to the acceptance prompt, entering the data entry into the air traffic control system.

5. The method of claim 1, wherein the vehicle is an aircraft, and wherein monitoring operation of the vehicle comprises receiving broadcast data from an aircraft surveillance system onboard the aircraft.

6. The method of claim 5, wherein the first alert is suppressed upon the monitored operation of the vehicle differing from the expected vehicle operating trajectory by more than the threshold amount but the received broadcast from the aircraft surveillance system onboard the aircraft indicates that the vehicle is complying with the expected vehicle operating trajectory.

7. The method of claim 1, further comprising:
  receiving vehicle operation intent data from the vehicle; and suppressing the first alert upon:
the monitored operation of the vehicle differing from the expected vehicle operating trajectory by more than the first threshold amount and less than a second threshold amount; and
the vehicle operation intent data indicating that the vehicle is complying with the expected vehicle operating trajectory.

8. The computer-implemented method of claim 1, wherein transforming the at least one computer-readable vehicle operating instruction into a first expected vehicle operating trajectory for the vehicle comprises identifying a published procedure designation in the computer-readable vehicle operating instruction and retrieving an expected vehicle operating trajectory associated with the published procedure designation from a data structure; and
wherein the first threshold amount is based on at least one performance requirement associated with the published procedure designation.

9. The computer-implemented method of claim 1, wherein the first audio communication comprises at least one spoken vehicle operating instruction to a pilot of an aircraft; and
further comprising:
transforming the at least one computer-readable vehicle operating instruction into an entry for a flight management system of the aircraft;
providing an acceptance prompt to the pilot of the aircraft; and
upon receiving an affirmative response to the acceptance prompt, executing the entry in the flight management system.

10. A system, comprising:
a receiver configured to receive spoken audio communications between a vehicle traffic controller and an operator of a vehicle;
a tracking module configured to receive information related to operation of the vehicle;
a display module; and
a computer processor configured to:
perform speech-to-text translation on a spoken vehicle operating instruction from the vehicle traffic controller, received in a first audio communication by the receiver, to convert the at least one spoken vehicle operating instruction into at least one computer-readable vehicle operating instruction;
transform the at least one computer-readable vehicle operating instruction into an expected vehicle operating trajectory for the vehicle;
monitor operation of the vehicle, based on information related to operation of the vehicle received by the tracking module; and
output to the display module a first alert upon the monitored operation of the vehicle differing from the expected vehicle operating trajectory by a first threshold amount.

11. The system of claim 10, wherein the processor is further configured to:
perform speech-to-text translation on at least one spoken confirmation readback by the operator of the vehicle, received in a second audio communication by the receiver, to convert the at least one spoken confirmation readback into at least one computer-readable confirmation readback; and
output to the display module a second alert upon the at least one computer-readable confirmation readback differing in key elements from the at least one computer-readable vehicle operating instruction.

12. The system of claim 10, wherein the first audio communication is an instruction from an air traffic controller to an aircraft, and wherein the system further comprises an air traffic control system; and
wherein the processor is further configured to:
transform the at least one computer-readable vehicle operating instruction into a data entry for the air traffic control system;
output to the display module an acceptance prompt; and
entering the data entry into the air traffic control system upon receiving an affirmative response to the acceptance prompt.

13. The system of claim 10, wherein the tracking module is configured to receive vehicle operation intent data from the vehicle, and wherein the processor is further configured to suppress the first alert upon:
the monitored operation of the vehicle differing from the expected vehicle operating trajectory by more than the first threshold amount and less than a second threshold amount; and
the vehicle operation intent data indicating that the vehicle is complying with the expected vehicle operating trajectory.

14. The system of claim 10, wherein the computer processor transforms the at least one computer-readable vehicle operating instruction into a first expected vehicle operating trajectory for the vehicle by identifying a published procedure designation in the computer-readable vehicle operating instruction and retrieving an expected vehicle operating trajectory associated with the published procedure designation from a data structure; and
wherein the first threshold amount is based on at least one performance requirement associated with the published procedure designation.

15. A computer program product for monitoring vehicle compliance with a spoken operating instruction, the computer program product comprising:
a computer-readable storage medium having computer-readable program code embodied therewith, the computer-readable program code executable by one or more computer processors to:
receive a first audio communication that includes at least one spoken vehicle operating instruction to an operator of a vehicle;
perform speech-to-text translation on the first audio communication to convert the at least one spoken vehicle operating instruction from the first audio communication into at least one computer-readable vehicle operating instruction;
transform the at least one computer-readable vehicle operating instruction into a first expected vehicle operating trajectory for the vehicle using the computer processor;
monitor operation of the vehicle; and
upon the monitored operation of the vehicle differing from the expected vehicle operating trajectory by a first threshold amount, output a first alert.

16. The computer program product of claim 15, wherein the computer-readable program code is further executable to:
receive a second audio communication that includes at least one spoken confirmation readback by the operator of the vehicle;
perform speech-to-text translation on the second audio communication to convert the at least one spoken confirmation readback from the second audio communication into a computer-readable confirmation readback; and upon the at least one computer readable confirmation readback differing in key elements from the at least one computer-readable vehicle operating instruction, output a second alert.

17. The computer program product of claim 16, wherein the first audio communication is an instruction from an air traffic controller to one aircraft among a plurality of aircraft, wherein the first audio communication includes a first call sign for the aircraft, wherein the second audio communication includes a second vehicle call sign, and wherein the computer program product determines whether the at least one computer-readable confirmation readback in the second audio communication differs from the at least one computer-readable vehicle operating instruction in the first audio communication if the first call sign matches the second call sign.

18. The computer program product of claim 15, wherein the first audio communication is an instruction from an air traffic controller to an aircraft, and wherein the computer-readable program code is further executable to:

transform the at least one computer-readable vehicle operating instruction into a data entry for an air traffic controller control system;

provide an acceptance prompt to the air traffic controller; and upon receiving an affirmative response to the acceptance prompt, enter the data entry into the air traffic control system.

19. The computer program product of claim 15, wherein the computer-readable program code transforms the at least one computer-readable vehicle operating instruction into a first expected vehicle operating trajectory for the vehicle by identifying a published procedure designation in the computer-readable vehicle operating instruction and retrieving an expected vehicle operating trajectory associated with the published procedure designation from a data structure; and wherein the first threshold amount is based on at least one performance requirement associated with the published procedure designation.

20. The computer program product of claim 15, wherein the first audio communication comprises at least one spoken vehicle operating instruction to a pilot of an aircraft; and wherein the computer-readable program code is further executable by to:

transform the at least one computer-readable vehicle operating instruction into an entry for a flight management system of the aircraft;

provide an acceptance prompt to the pilot of the aircraft; and upon receiving an affirmative response to the acceptance prompt, execute the entry in the flight management system.

* * * * *